(12) United States Patent
Kompella et al.

(10) Patent No.: US 8,046,533 B2
(45) Date of Patent: Oct. 25, 2011

(54) SYSTEM AND METHOD FOR SECTOR REMAPPING

(75) Inventors: Murthy Kompella, Costa Mesa, CA (US); Joseph Harold Steinmetz, Costa Mesa, CA (US); Narayan Ayalasomayajula, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 286 days.

(21) Appl. No.: 12/401,548

(22) Filed: Mar. 10, 2009

(65) Prior Publication Data

US 2010/0232049 A1  Sep. 16, 2010

(51) Int. Cl.
*G06F 12/00* (2006.01)
(52) U.S. Cl. .......... 711/112; 711/202; 711/E12.001
(58) Field of Classification Search .......... None
See application file for complete search history.

(56) References Cited

U.S. PATENT DOCUMENTS

| | | | |
|---|---|---|---|
| 6,191,712 B1* | 2/2001 | Still | 341/95 |
| 7,801,120 B2* | 9/2010 | Steinmetz et al. | 370/360 |
| 2008/0016275 A1* | 1/2008 | Sebastian et al. | 711/114 |
| 2008/0028157 A1* | 1/2008 | Steinmetz et al. | 711/149 |
| 2008/0052728 A1* | 2/2008 | Steinmetz et al. | 719/313 |
| 2008/0077763 A1* | 3/2008 | Steinmctz et al. | 711/170 |
| 2008/0162811 A1* | 7/2008 | Steinmetz et al. | 711/114 |
| 2009/0313426 A1* | 12/2009 | See et al. | 711/112 |

\* cited by examiner

*Primary Examiner* — Kevin Verbrugge
(74) *Attorney, Agent, or Firm* — Morrison & Foerster LLP (57) ABSTRACT

Disclosed herein is an improved sector remapping method that maps logical sectors into physical sectors in storage disks such as SATA (Serial ATA) drives without reducing either storage capacity or I/O performance efficiency. Under this sector remapping method, logical sectors of data can be written into the physical sectors of a storage device through control frames having padded data or information associated with the padded data, as well as data frames having real data to be stored. With the padded data to be added to the real data, the frames provide multiple physical sectors to be transmitted into the storage device in a single write operation. The sector remapping method can be implemented in a storage bridge coupled to a storage device such as SATA drives.

45 Claims, 10 Drawing Sheets

| Alignment Unit | 1 | 2 | 4 | 8 | 12 | 16 | 32 | 40 | 42 | 48 | 56 | 64 |
|---|---|---|---|---|---|---|---|---|---|---|---|---|
| Physical blocks | 2 | 3 | 5 | 9 | 13 | 17 | 33 | 41 | 43 | 49 | 57 | 65 |
| Pad bytes | 504 | 496 | 480 | 448 | 416 | 384 | 256 | 192 | 176 | 128 | 64 | 0 |
| % Disk Capacity Reduction | 49.2% | 32.3% | 18.8% | 9.7% | 6.3% | 4.4% | 1.5% | 0.9% | 0.8% | 0.5% | 0.2% | 0.0% |

SYSTEM AND METHOD FOR SECTOR REMAPPING

FIELD OF THE INVENTION

This relates to computer storage technologies, and more particularly, to an improved sector remapping algorithm that translates logical sectors into physical sectors in storage disks such as SATA (Serial ATA) drives without reducing storage capacity or compromising write and/or read efficiency in connection with I/O performance.

BACKGROUND OF THE INVENTION

The low-cost SATA drive technology has been widely employed for enterprise storage applications. However, most currently available SATA HDDs (Hard Disk Drives) can be formatted only with a sector size of 512 bytes. This does not meet the need of most enterprise storage applications for an expanded sector size (e.g., 520 bytes, 524 bytes or 528 bytes) that provides additional bytes for data protection information to ensure data integrity. Therefore, certain sector remapping mechanisms are needed to map between the two types of sectors. For instance, when data from enterprise storage applications is written into SATA drives, the data originally formatted or organized in logical sectors having an expanded size, such as 520 bytes, needs to be remapped to fit into physical disk sectors having a size of 512 bytes. None of the existing solutions can provide a sector remapping algorithm without compromising disk storage capacity or I/O performance.

SUMMARY OF THE INVENTION

Embodiments of the present invention provide an improved sector remapping algorithm that maps logical sectors into physical sectors in storage disks such as SATA (Serial ATA) drives without reducing storage capacity or I/O performance efficiency. In one embodiment, the improved sector remapping algorithm enables storing data blocks into a storage device having a plurality of physical sectors through forming a first frame containing a first data padding associated with a first physical sector in said storage device; forming a second frame containing said data blocks to be written into said storage device, said data blocks comprising one or more logical sectors, said logical sectors different from said physical sectors at least in size; forming a third frame containing a second data padding associated with a second physical sector in said storage device; and transmitting said first, second and third frames to said storage device in a single write operation, wherein a total of said first data padding, said data blocks and said second data padding comprise multiple physical sectors. In terms of implementation, the above sector remapping algorithm can be embodied in computer-executable instructions in a computer readable storage medium according to various embodiments of the present invention.

In another embodiment, an apparatus is provided to perform sector remapping between logical sectors and physical sectors. The apparatus comprises a sector translator configured to receive a logical data sector and calculate data to be padded to said logical data sector to form multiple physical data sectors. The apparatus further includes a transmitter coupled to the sector translator and the transmitter is configured to generate frames for writing said logical data sector into a storage device comprising a plurality of physical sectors for storing data, said frames comprising a control frame containing at least a portion of said padded data, and transfer said logical data sector into said storage device via said frames so that said multiple physical data sectors excluding said padded data are written into said plurality of physical sectors in a single write operation.

Yet another embodiment of the present invention provides a storage device having a plurality of physical sectors for storing data. The storage device includes a drive configured to receive a write command in connection with writing data into said storage device, receive one or more frames containing said data, and for each of said one or more frames, determine whether said frame is a control frame comprising at least a portion of padding data or a data frame comprising at least a portion of said data; wherein a total of said data and said padding data in said one or more frames comprise multiple physical sectors to be written into said storage device in an unaligned write operation.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the present invention relate to an improved sector remapping algorithm that translates logical sectors into physical sectors in storage disks such as SATA drives without reducing storage capacity or compromising write and/or read efficiency in connection with I/O performance. In particular, one embodiment of the present invention provides a bridge that works as a translator between the enterprise storage applications and disk drives by remapping 520-byte logical sectors to 512-byte physical sectors. This bridge receives logical sectors of data to be written into the disk, and based on the received logical sectors, includes certain padded data to construct total data blocks that fit in multiple physical sectors. After the bridge transmits the total data to a disk drive in different frames, the disk drive determines whether each frame contains real data to be written into the disk or mere padded data. If the frame contains padded data, the drive will preserve the unmodified data portions in the physical sectors to which new data will be written. One way of doing so is to disable writing the padded data into the disk. As a result, storage capacity is preserved and no extra reads are needed in the data writing process to cause additional delays.

Although embodiments of the invention may be described and illustrated herein in terms of remapping 520-byte sectors into 512-byte sectors, it should be understood that embodiments of this invention are not so limited, but can be additionally applicable to logical and physical sectors of variable sizes. In addition, embodiments of the invention may be described and illustrated herein in terms of being implemented in a storage bridge and/or a SATA disk drive, but it should be understood that various hardware or software, system components and configurations can be utilized for different implementations.

Figure 1:
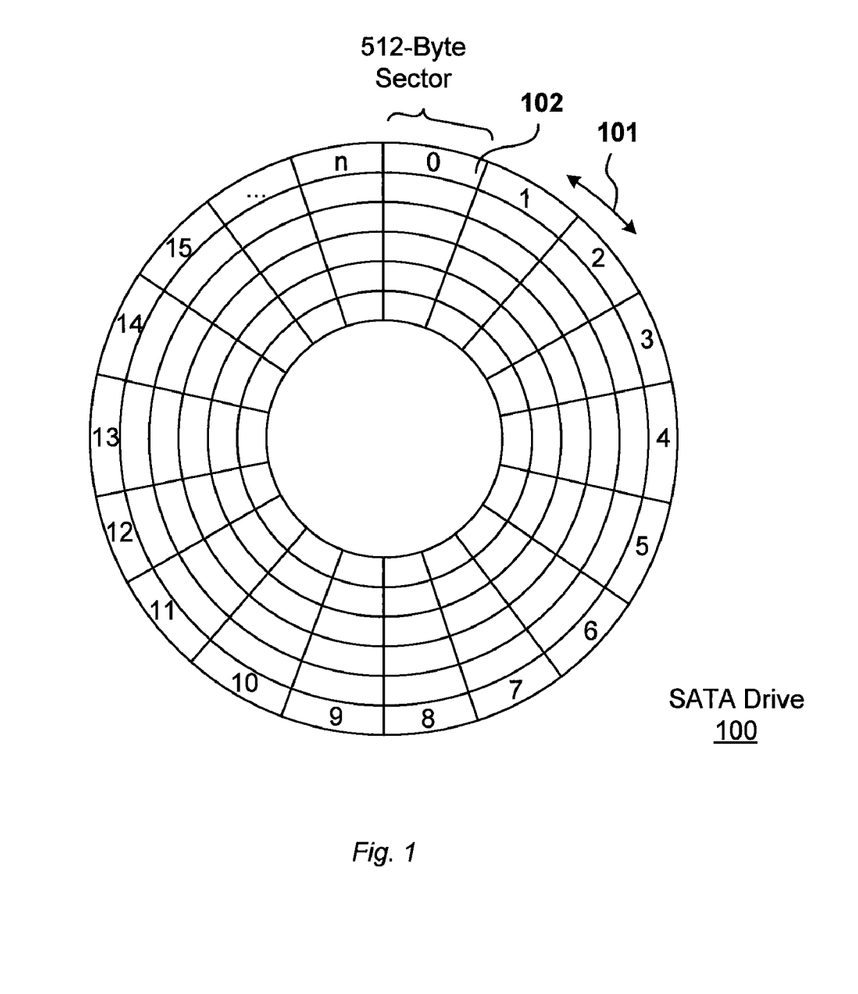
FIG. 1 depicts an exemplary SATA disk drive for implementing various embodiments of the present invention.

Referring now to FIG. 1, an exemplary SATA disk drive for implementing various embodiments of the present invention will be described. As shown in FIG. 1, a SATA disk drive 100 is conceptually considered to consist of a number of tracks that are each divided into sectors. A track is a circular band on the surface of a disk platter, such as track 101, an outer-circumferential band on an SATA disk-drive platter. Each track is divided into radial sections, called sectors, such as sector 102, the first sector of the first track 101. In general, disk access operations occur at the granularity of sectors. Modern disk drives may include a number of parallel-oriented platters. All like-numbered tracks on both sides of all of the parallel platters together compose a cylinder. In SATA disk drives, as illustrated in FIG. 1, each sector of each track generally contains a data payload of 512 bytes. The sectors contain additional information, including a sector index and error-detection and/or error-correction information, which is generally maintained and used by the disk-drive controller, and may not be externally accessible.

Figure 2:
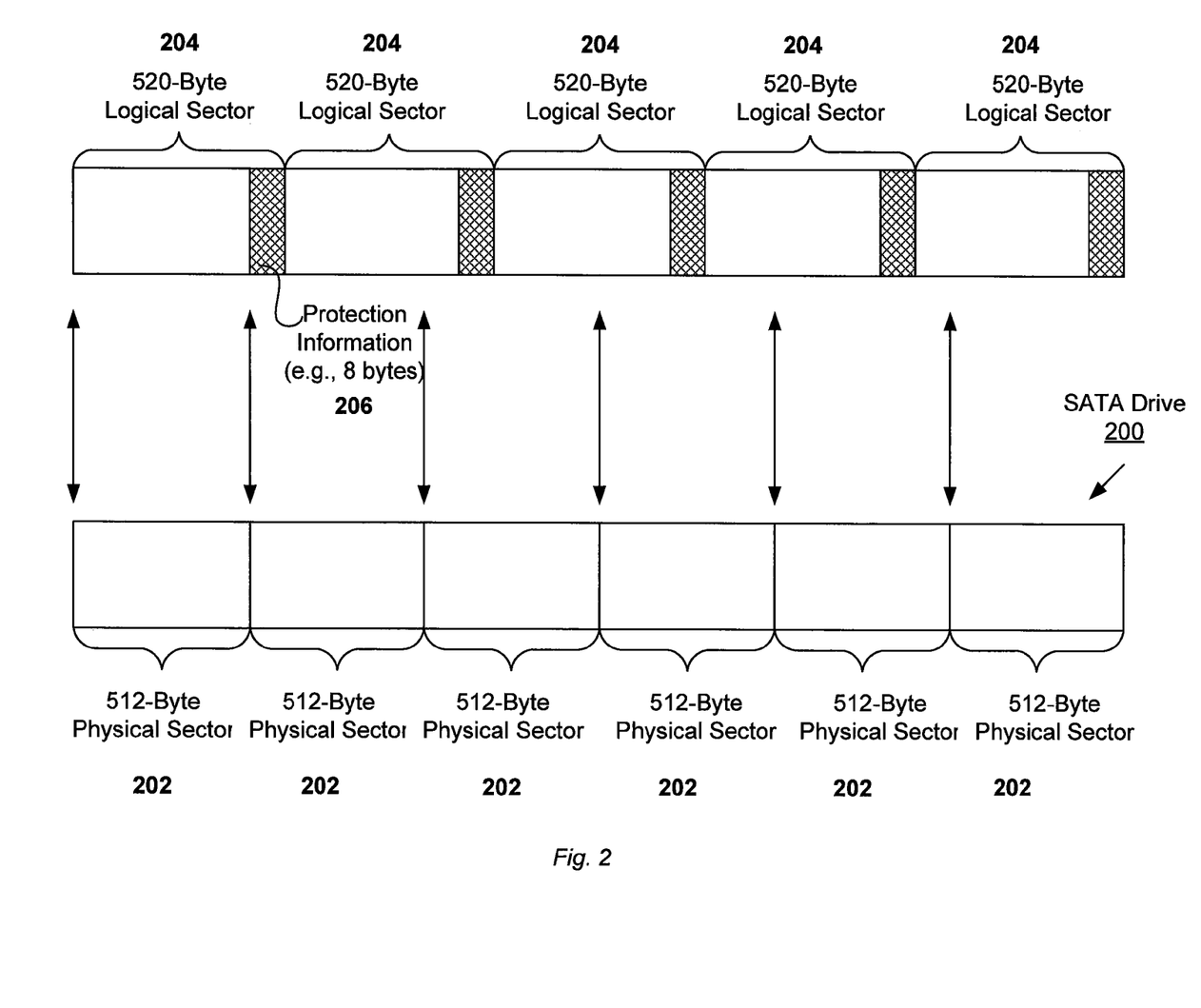
FIG. 2 is a block diagram demonstrating differences between exemplary logical sectors and physical sectors according to various embodiments of the present invention.

As aforementioned, most enterprise storage applications utilize expanded sectors or logical sectors having more than 512 bytes per sector. FIG. 2 is a block diagram demonstrating exemplary logical sectors as compared with physical sectors of 512 bytes typical of SATA disk drives according to various embodiments of the present invention. As shown in FIG. 2, a SATA disk drive comprises a plurality of physical sectors or 512-byte sectors 202. In contrast, enterprise storage applications tend to add protection information, such as the 8 bytes of metadata 206 in FIG. 2, for each data sector to form a logical or virtual sector. Each logical sector 204, as shown in the example of FIG. 2, has a size of 520 bytes. Due to the different sector size, logical sectors of 520 bytes cannot be mapped into physical sectors of 512 bytes on a one-to-one basis. Instead, adjustment or alignment of data is needed when data blocks in the form of logical sectors are written into the physical sectors of SATA drives. For instance, when one 520-byte sector is written into a SATA disk, the first 512 bytes will take one physical sector and the additional 8 bytes will take partial space in a neighboring 512-byte sector. Therefore, when the second 520-byte sector is written into the disk, the drive needs to determine which physical sectors to use for storing the new data. As will be described in detail below, FIGS. 3a-b, 4a-c, and 5-7 demonstrate various sector remapping algorithms.

Figure 3A:
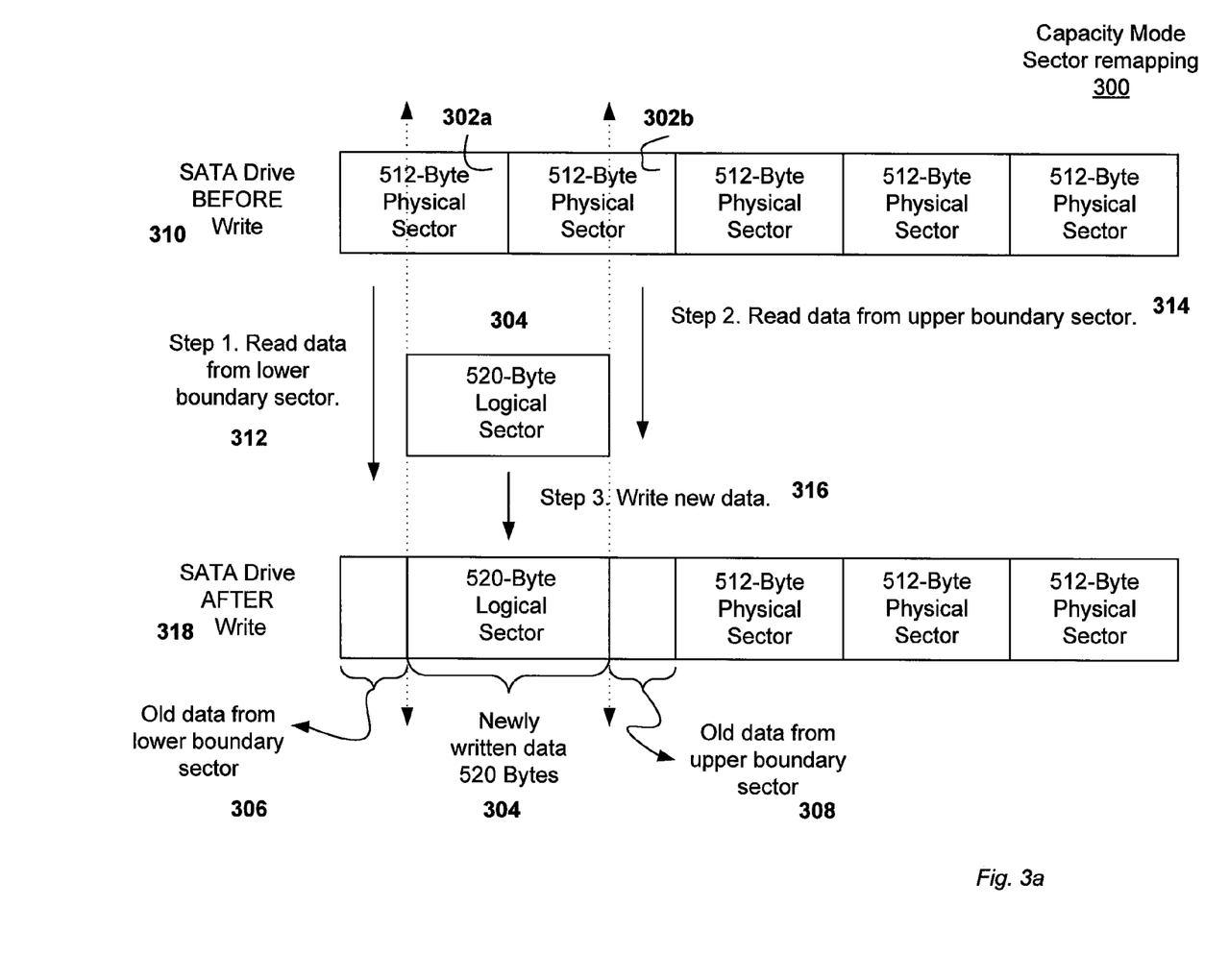
FIG. 3a is a block diagram illustrating exemplary sector remapping in a capacity mode according to various embodiments of the present invention.

FIG. 3a provides an exemplary sector remapping algorithm, namely, sector remapping in a capacity mode 300, according to various embodiments of the present invention.

As shown in FIG. 3a, a SATA disk drive comprises multiple 512-byte physical sectors, for example, sectors 302a and 302b. When a number of logical sectors of data, such as a 520-byte sector 304, are written into the disk, these sectors need to be remapped due to their size difference as compared to the physical sectors. One sector remapping algorithm is to essentially preserve the previously valid data in the physical sectors in order to maximize the storage capacity. For example, when the 520-byte sector 304 is written into a SATA disk, this logical sector can take space between two 512-byte sectors, such as sectors 302a and 302b. In that case, sector 302a is referred as the lower boundary sector, and sector 302b the upper boundary sector.

As shown in FIG. 3a, writing the 520-byte sector 304 into the disk results in overwriting certain old data in sectors 302a and 302b, while leaving unmodified a portion of old data 306 from the lower boundary sector 302a and a portion of old data 308 from the upper boundary sector 302b. Typically, such write performance employs a Read Modify Write (RMW) algorithm, as exemplified in steps 312 to 316 in FIG. 3a. Specifically, this RMW algorithm starts with an exemplary block 310 showing the disk drive before the write operation. At step 312, the old or unmodified data portion 306 from the lower boundary sector 302 is read and placed into a data buffer (not shown in FIG. 3a). Similarly, the old or unmodified data portion 308 is read from the upper boundary sector 302b and placed into the data buffer at step 314. Subsequent to the two reads, at step 316 new data from the logical sector 304 is placed into the buffer along with the two old data portions 306 and 308 to form two new 512-byte sectors. Finally, these two newly formed 512-byte sectors are written into the disk drive, as shown in the exemplary block 318. FIG. 3a shows a simple example of writing only one 520-byte sector into two 512-byte sectors, but it should be understood that the RMW algorithm scales naturally to any number of sectors, as will be described in FIG. 3b. In one implementation, the required calculations to translate logical sectors into physical sectors are automatically performed by a bridge coupled to the disk drive (see FIG. 7). Further, optimization (e.g., avoiding one read when the lower or upper boundary sector is aligned with one logical sector) and error handling techniques are employed as well in the sector remapping process.

Figure 3B:
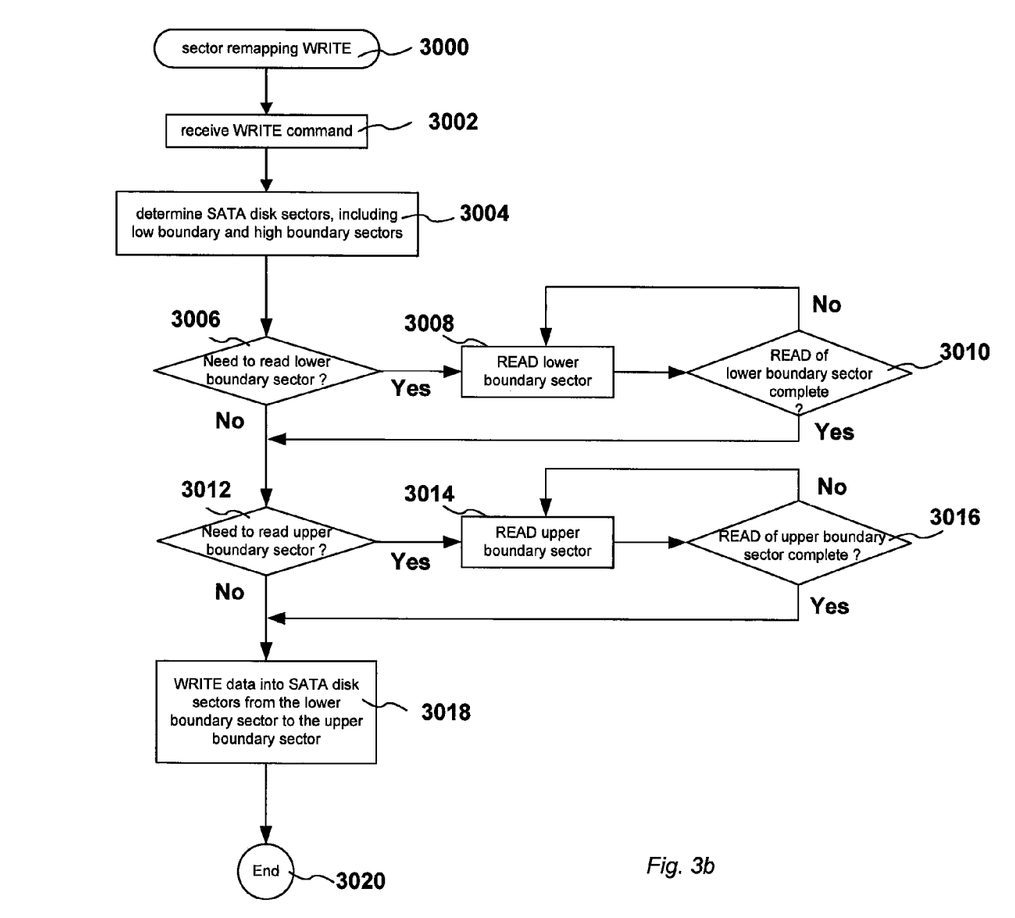
FIG. 3b provides a flowchart diagram showing exemplary Read-Modify-Write operations in connection with the capacity mode sector remapping of FIG. 3a according to various embodiments of the present invention.

FIG. 3b provides a flowchart diagram showing exemplary Read-Modify-Write operations in connection with writing a number of logical sectors into the disk drive according to various embodiments of the present invention. In one embodiment, the Read-Modify-Write operations are performed by a bridge coupled to the disk drive. First, in step 3002, a WRITE command is received from an external processing entity specifying logical sectors to be written therein. Next, in step 3004, the bridge determines the actual disk or physical sectors to be written, including the lower boundary and upper boundary sectors. Following the determination, the bridge undertakes the Read-Modify-Write operations with respect to the boundary sectors. Specifically, in step 3006, the bridge determines whether there is a need to read the lower boundary sector associated with the received WRITE command. When the beginning of a logical sector coincides with the beginning of an actual physical sector, the entire lower boundary sector will be overwritten and thus does not need to be read for the following write operation. If the lower boundary sector is needed, the bridge initiates a read of the lower boundary sector in step 3008. Then in step 3010, the bridge checks whether the read operation of lower boundary sector is complete, and if not, the read operation will continue. Otherwise, the process will proceed to processing the upper boundary sector.

Similar to processing the lower boundary sector, in step 3012, the bridge determines if there is a need to read the upper boundary sector involved in the write operation. When the end of the final logical sector coincides with the end of an actual physical sector, the entire upper boundary sector will be overwritten and there is no need to read this sector for the following write operation. If the upper boundary sector is needed, a read operation will be initiated for the upper boundary sector in step 3014. when the read operation of the upper boundary sector is not completed, as detected in step 3016, the bridge continues to read the upper boundary sector. Upon completion of the read operation, the process proceeds to step 3018, in which logical sectors of data are written into the drive from the lower boundary to the upper boundary sector. After the write operation is complete, the process ends at step 3020.

Capacity mode sector remapping ensures no reduction in storage capacity when minimal to none of the disk space is used for the sole purpose of aligning logical sectors with the natural divides or boundaries between physical sectors. However, due to the extra reads in RMW operations, the remapping performance is significantly compromised. This is opposite from the performance mode as shown in FIGS. 4*a-c*, in which sector remapping can be performed efficiently at the cost of storage capacity.

Figure 4A:
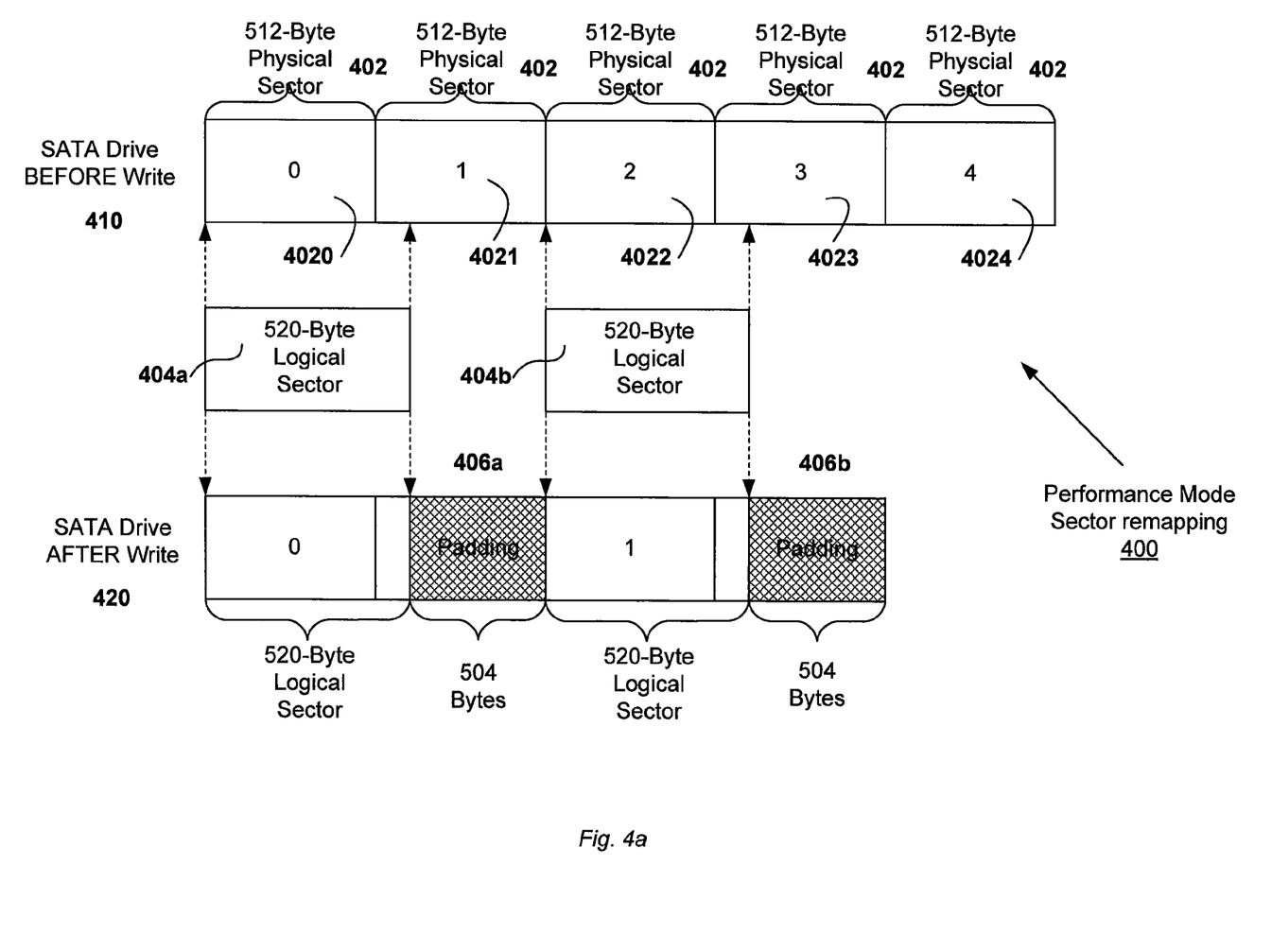
FIGS. 4a-c illustrate exemplary sector remapping in a performance mode according to various embodiments of the present invention.
Figure 4B:
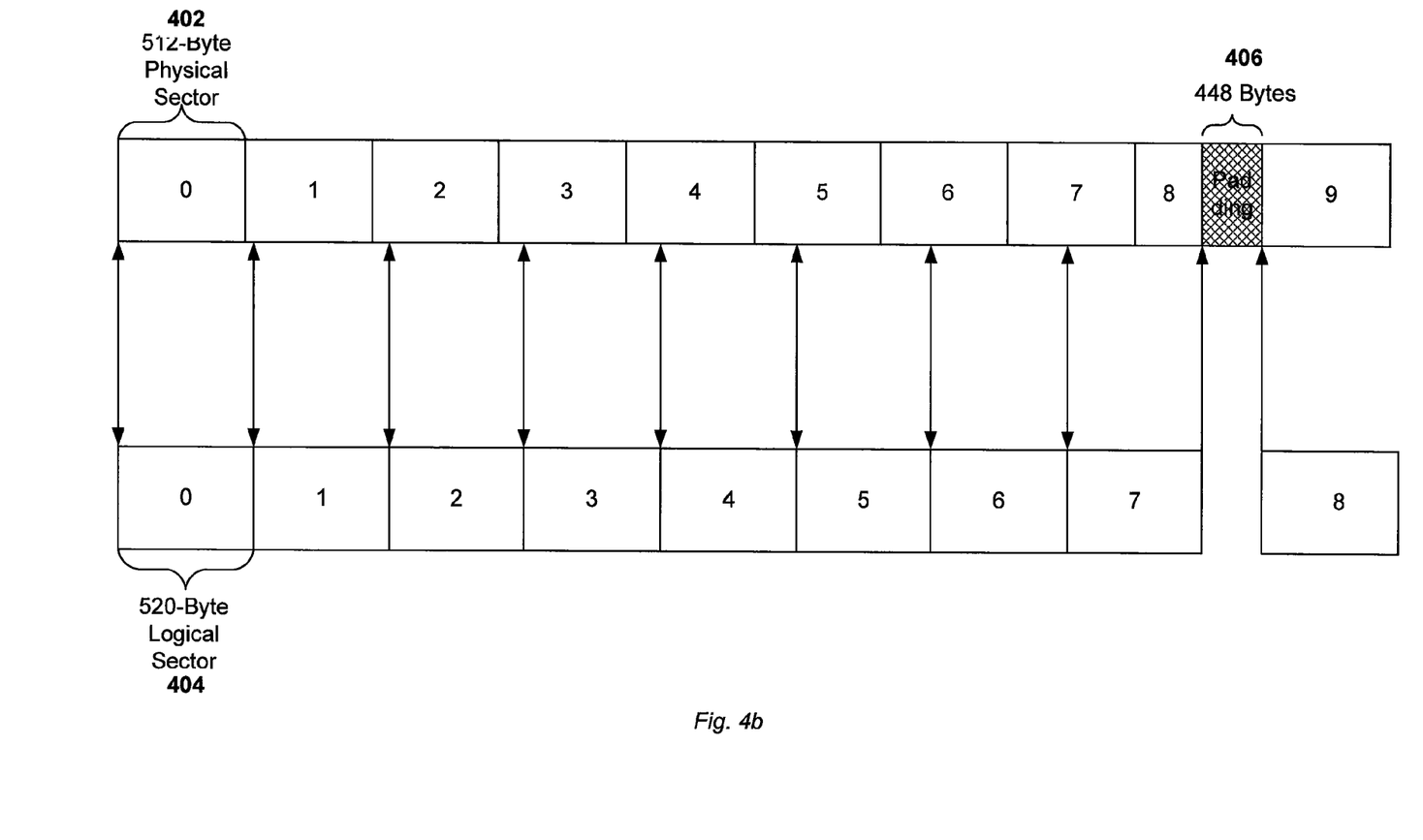
Figure 4C:
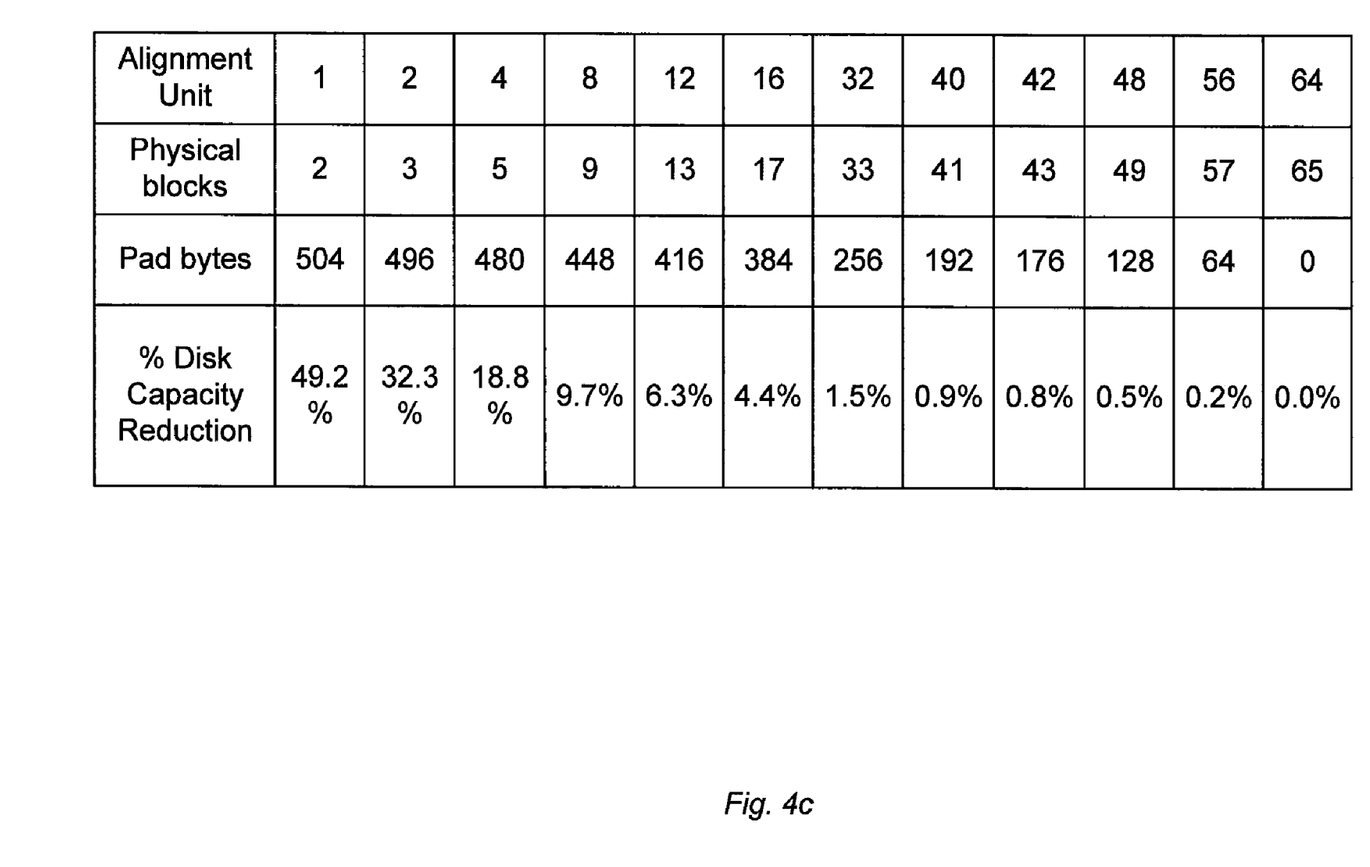

Using the example in FIG. 4*a* for illustration, when two 520-byte logical sectors 404*a* and 404*b* are written into the disk drive comprising a number of 512-byte sectors 402, padding data 406*a* and 406*b* are inserted to ensure perfect alignment of the beginning of each logical sector with that of a physical sector. As shown in FIG. 4*a*, for logical sector 404*a*, the first 512 bytes of data can fill one physical sector, such as sector 4020, and the additional 8 bytes fill some but not all of the space of the next sector 4021. In order to align the beginning of the next logical sector 404*b* with the beginning of the physical sector 4022, 504 bytes of padding data 406*a* need to be added to fill up the remaining space of sector 4021. Similarly, 504 bytes of padding data 406*b* are needed to fill up the sector 4023 for alignment of the next logical sector and physical sector.

Performance mode sector remapping can avoid or reduce the read operations associated with the unaligned writes. However, it can also significantly reduce the capacity in the disk drive. In the above example, the storage of each 520-byte sector of data needs two physical sectors, of which 504 bytes are used for padded data. This almost 49.2% (504 bytes out of 1024 bytes) of disk capacity reduction. FIG. 4*b* shows an exemplary alignment of every 8 logical sectors rather than every logical sector, which means, padding is added in every $9^{th}$ physical sector to force alignment for every 8 logical sectors. As shown in FIG. 4*b*, 448 bytes of padding data will be inserted, which still causes an overall 9.7% of reduction in disk capacity. The disk capacity reduction rate can be improved by increasing the number of alignment units in logical sectors, as shown in a chart in FIG. 4*c*. For example, when every 64 520-byte sectors are aligned with every 65 512-byte sectors, there is no capacity reduction. However, the increase of alignment units also incurs operational difficulty and inefficiency in connection with writing those aligned logical sectors. In addition, for certain disk drive such as SSD (Solid-State Drive) devices, the capacity is already small, which renders the use of the performance mode sector remapping almost infeasible due to the significant capacity reduction. Even for those HDD (Hard Disk Drive) devices having a much larger capacity, there is approximately 50% reduction in capacity if the HDDs employ LDS (Long Data Sectors) and the most common initiator I/O size requires padding every 4096 bytes in the drive for sector remapping in performance mode.

In light of the above, sector remapping in either capacity mode or performance mode has downsides, which drives the need for a better solution for sector remapping with no compromise in capacity or performance. Embodiments of the present invention provide such a solution as demonstrated in FIG. 5. It should be understood that the sector remapping algorithm to be described in detail below is not limited to the example of FIG. 5, i.e., mapping one 520-byte logical sector into two 512-byte physical sectors, and is applicable to remap any logical sectors into physical sectors.

Figure 5:
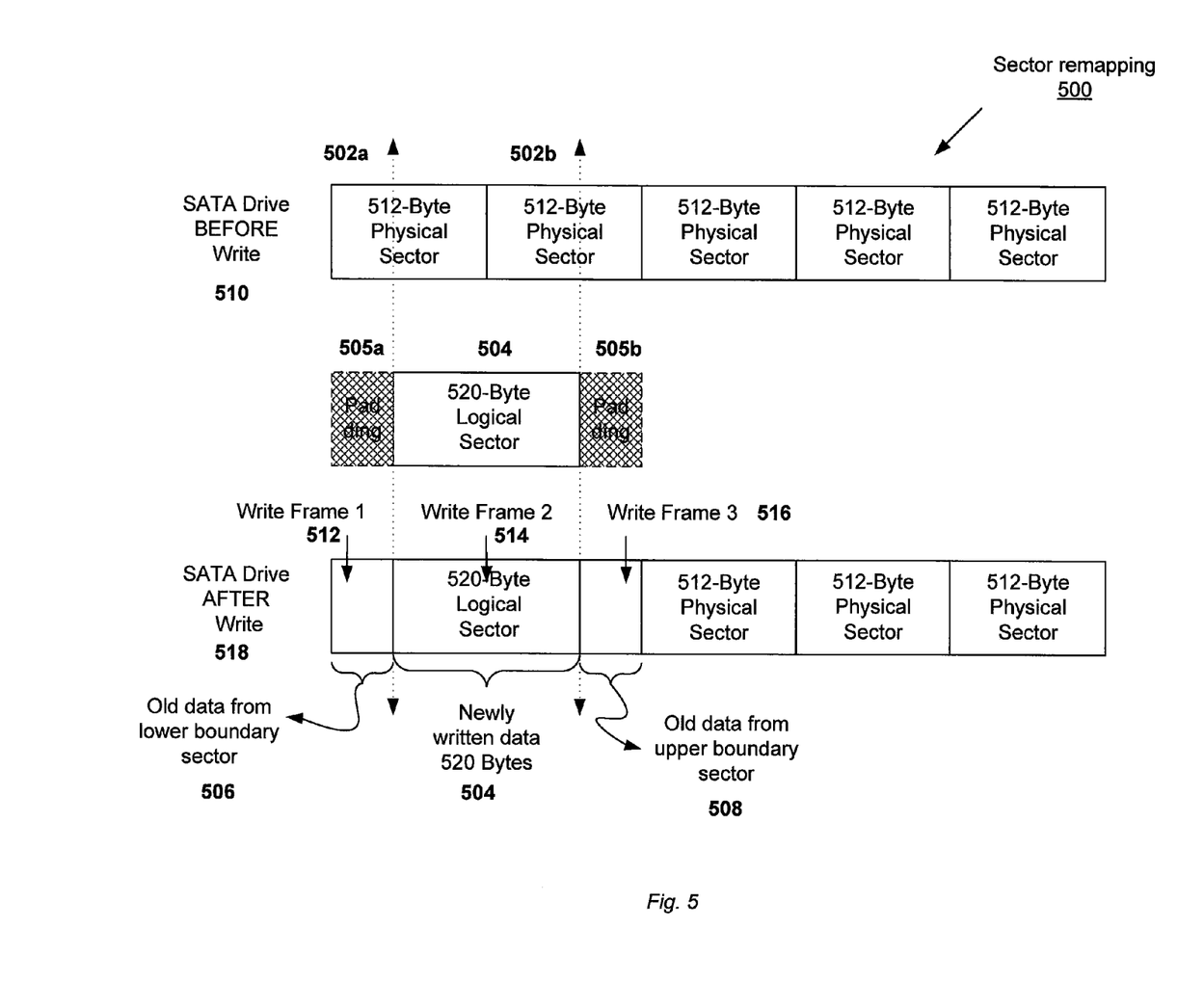
FIG. 5 is a block diagram demonstrating an exemplary sector remapping mechanism with no compromise in either capacity or performance according to various embodiments of the present invention.

In FIG. 5, one 520-byte sector 504 is written into the disk drive, and more specifically, the two physical sectors 502*a* and 502*b*. This can be accomplished in a single write operation without extra reads following an improved sector remapping algorithm according to various embodiments of the present invention. Furthermore, under such an improved sector remapping algorithm, the previously valid data including an old data portion 506 from the lower boundary sector 502*a* and an old data portion 508 from the upper boundary sector are preserved in the disk, and there is no reduction in storage capacity when comparing the SATA disk drive before write 510 with the disk after write 518 in FIG. 5. In one embodiment, the 520-byte sector 504 is written in the disk drive through a few frames created and transmitted from a system component such as a bridge to the disk drive. Specifically, when the logical sector 504 is received in connection with a write command, the bridge employs two physical sectors, sectors 502*a* and 502*b*, for example, for storing the data in the sector 504. In mapping the sector 504 into sectors 502*a* and 502*b*, the bridge determines a certain amount of padding data (e.g, 504 bytes in this example) to be added to the data in the sector 504 (i.e., 520 bytes) so as to ensure the total amount of data fits the space of two 512-byte sectors in the disk drive. In addition, in an unaligned write operation, the sector 504 overwrites part of sector 502*a* and part of sector 502*b*, leaving an unmodified data section in each physical sector, such as the old data portions 506 and 508. Accordingly, in mapping the sector 504 into sectors 502*a* and 502*b*, the bridge adds to the sector 504 a first portion of padding data 505*a* that corresponds to the unmodified data portion 506, and a second portion of padding data 505*b* that corresponds to the unmodified data portion 508. Subsequently, the bridge creates three frames to hold the padding data 505*a*, data of sector 504 and padding data 505*b* respectively. These frames will be received and processed at the disk drive following steps 512, 514 and 516, as will be described in detail below.

Figure 6:
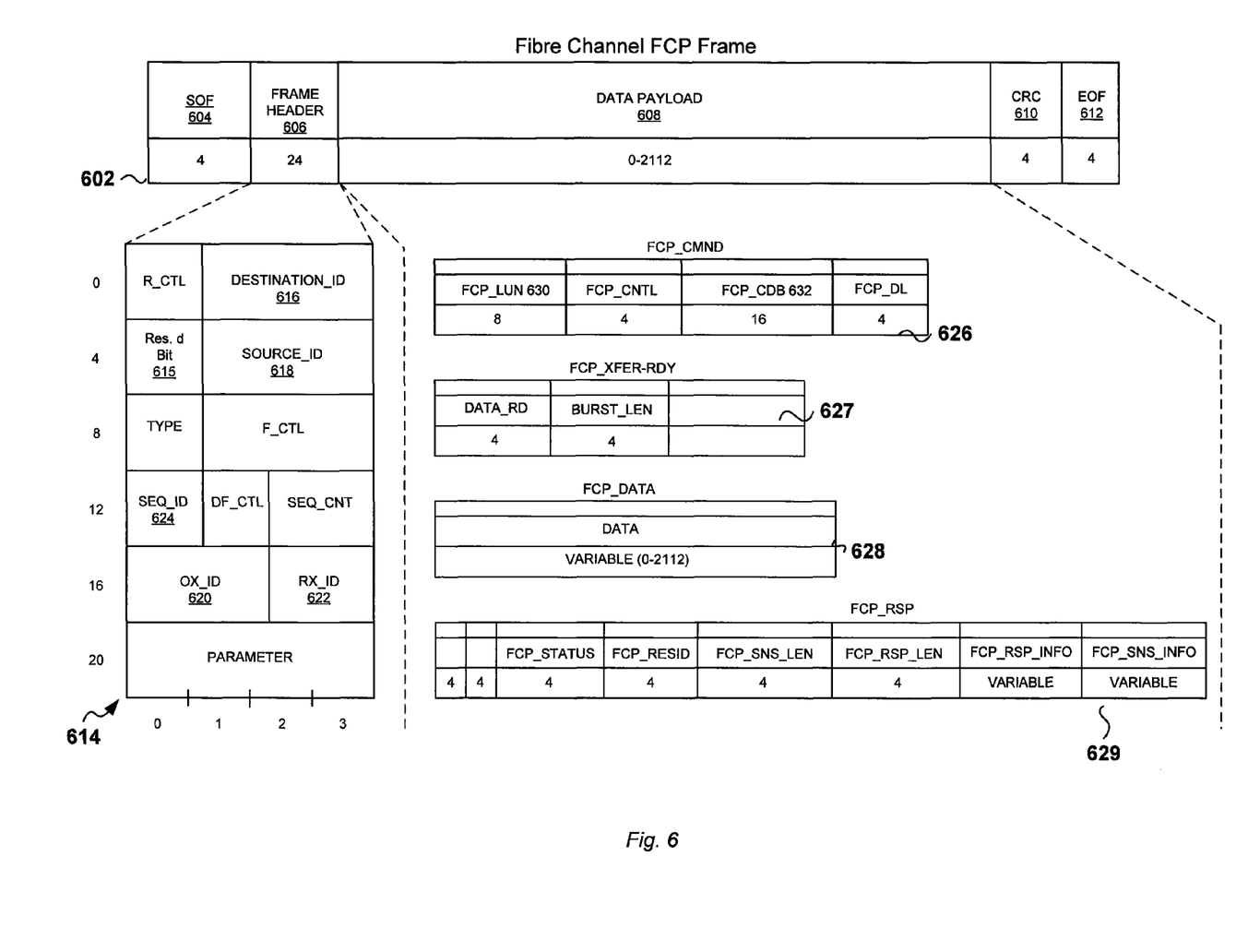
FIG. 6 is a block diagram showing an exemplary FC (Fibre Channel) frame according to various embodiments of the present invention.

FIG. 6 is a block diagram showing an exemplary FC (Fibre Channel) frame according to various embodiments of the present invention. As shown in FIG. 6, the FC frame 602 comprises five high level sections 604, 606, 608, 610 and 612. The first high level section, called the start-of-frame delimiter 604, usually comprises 4 bytes that mark the beginning of the frame. The next high level section, called frame header 606, usually comprises 24 bytes that contain addressing information, sequence information, exchange information, and various control flags associated with the frame. A detailed view of the frame header 604 is shown in the block 614.

As seen in block 614, the frame header contains a reserved bit 615. This bit is pre-set with values to differentiate a frame containing padding data from a frame containing real data to be stored. For example, if the reserved bit is set as one (1), that indicates the frame is a padded data frame or a control frame containing padding data, and if the bit is set as zero (0), the frame will be identified as a data frame comprising real data to be stored in the disk drive. It should be understood that using a reserved bit is one exemplary mechanism of informing the target device whether the frame payload contains padded or real data and embodiments of the invention are not so limited, but can employ other mechanism to accomplish the same. For example, the initial Write command sent to the drive can be enhanced to indicate how many "first pad bytes" and "last pad bytes" should remain when logical sectors of data are written into the drive. In the frame header, there is also a destination identifier ("D_ID"), or DESTINATION_ID 616, which is a 24-bit FC address indicating the destination FC port for the frame. On the other hand, the source identifier ("S_ID"), or SOURCE_ID 618, is a 24-bit address that indicates the FC port that transmitted the frame. The originator ID, or OX_ID 620, and the responder ID 622, or RX_ID, together compose a 32-bit exchange ID that identifies the exchange to which the frame belongs with respect to the originator (or initiator) and responder (or target), among the FC ports. The sequence ID 624, or SEQ_ID, identifies a sequence to which the frame belongs.

The next high level section 608, called data payload, contains the actual data packaged within the FC frame. For example, in a control frame as mentioned above, the actual data packaged within the frame comprises padding data instead of real data to be written. Besides data, the data payload also contains encapsulating protocol information that is being transferred according to a higher-level protocol, such as IP and SCSI. FIG. 6 shows four basic types of data payload layouts 626, 627, 628 and 629 used for data transfer according to the SCSI protocol.

The first format 626, called the FCP_CMND, is used to send a SCSI command from an initiator to a target. The FCP_LUN field 630 comprises an 8-byte address that may, in certain implementations, specify a particular SCSI-bus adapter, a target device associated with that SCSI-bus adapter, and a logical unit number ("LUN") corresponding to a logical device associated with the specified target SCSI device that together represent the target for the FCP_CMND. In other implementations, the FCP_LUN field 630 contains an index or reference number that can be used by the target FC adapter to determine the SCSI-bus adapter, a target device associated with that SCSI-bus adapter, and a LUN corresponding to a logical device associated with the specified target SCSI device. An actual SCSI command, such as a SCSI read or write I/O command, is contained within the 16-byte field FCP_CDB 632.

The second type of data payload format 627 shown in FIG. 6 is called the FCP_XFER_RDY layout. This data payload format is used to transfer a SCSI notification from the target to the initiator when the target is prepared to begin receiving or sending data.

The third type of data payload format 628 shown in FIG. 6 is the FCP_DATA format. The FCP_DATA format is used for transferring the actual data that is being read from, or written to, a data storage device as a result of execution of a SCSI I/O transaction. In the example demonstrated in FIG. 5, the actual data can be either padding data or real data from a logical sector to be written into the disk drive. If the packaged data is padding data, the reserved bit in the frame header will be set as 1 to indicate this frame is a padded data frame or control frame. In contrast, if the packaged data is data to be stored in the disk, the reserved bit in the frame header will be set as 0 to indicate the frame is a real data frame.

The final data payload format 629 shown in FIG. 6 is called the FCP_RSP layout, used to transfer SCSI status as well as other FCP status information from the target back to the initiator upon completion of the I/O transaction.

Referring back to FIG. 5, at step 512, the bridge writes the first frame that contains padding data 505a to the disk drive. In response to receiving the first frame, the drive can determine whether this frame is a real data frame or padded data frame based on the reserved bit in the frame header. After determining the first frame only contains padded data, the drive disables writing such data into the storage device according to one embodiment of the present invention. This can be accomplished by initiating writes associated with the padded data but masking the corresponding bytes to ensure the unmodified data portion, such as 506 in FIG. 5, is not corrupted or overwritten. Alternatively, the drive reads the data portion 506 from the sector 502a and replaces the padded data 505a in the first frame with the unmodified data portion 506 before initiating the writes of actual data of sector 504, along with the unmodified data 506, into the boundary sector 502a.

At step 514, the second frame is received at the disk drive. Similarly, the drive determines whether this frame is a real data frame based on the reserved bit. Once the second frame is determined to be a data frame, the data packaged therein, i.e., the 520 bytes of actual data in sector 504, will be written into successive physical sectors in the disk drive. In operation, the drive may successively receive multiple data frames comprising a number of logical sectors of data. In that case, the drive can continue the writes of these logical sectors until it receives a control frame comprising padded data again, such as the third frame received at step 516. The third frame is processed in a similar way to processing the first control frame as described above. In other words, if there are multiple data frames comprising logical sectors of data between the first and next control frames, the drive can perform writes of those logical sectors data directly into the disk continuously without waiting to read unmodified data from the physical sectors, thereby enhancing the performance at no cost of storage capacity. It should be noted that FCP is used in the above description an example of the transport protocol between the initiator and target device, and embodiments of the invention are not so restricted. Instead, many other types of protocols that can be used for communications between the initiator and target device are supported by various embodiments of the present invention.

Figure 7:
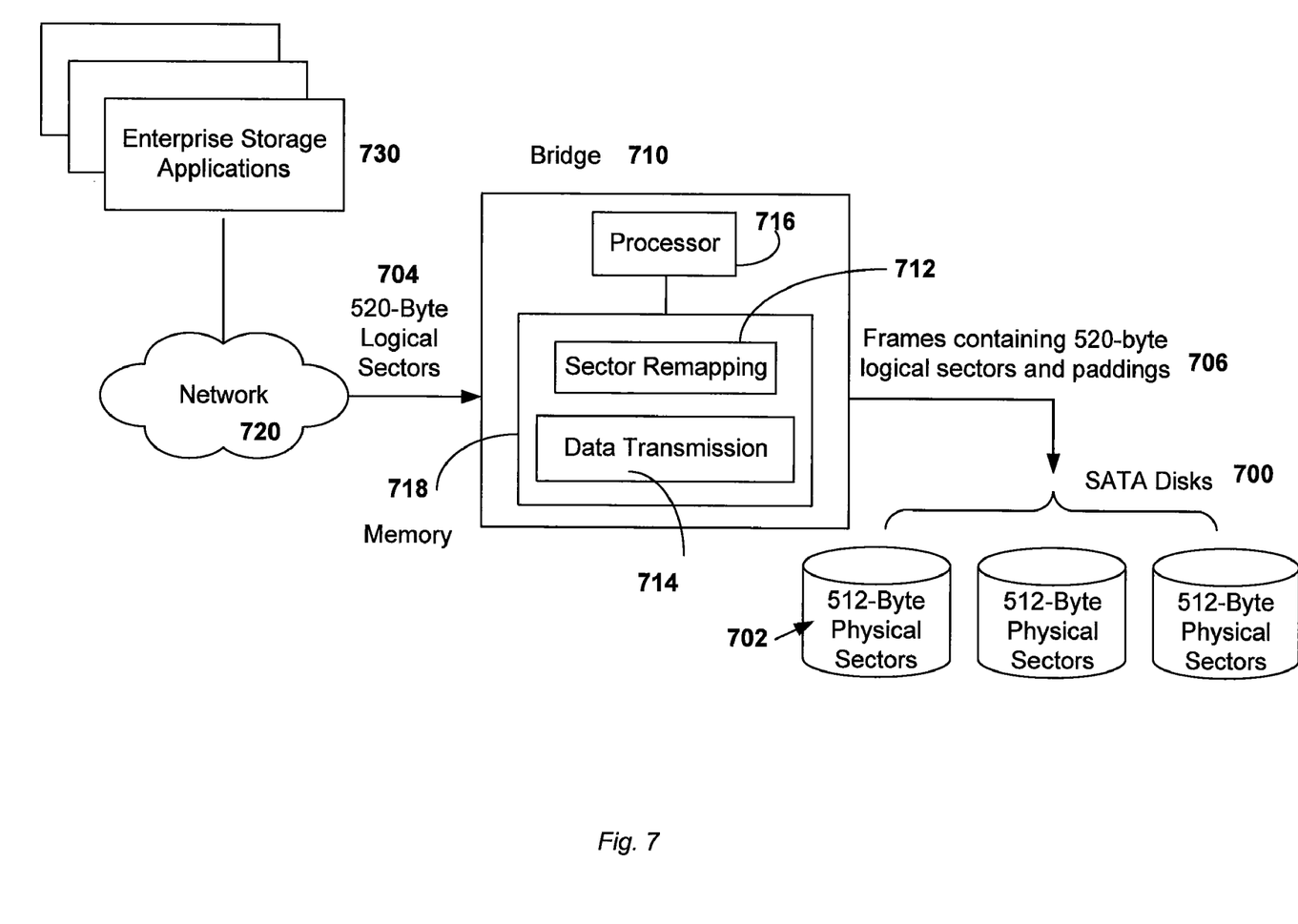
FIG. 7 is a block diagram showing an exemplary system configuration for sector remapping according to various embodiments of the present invention.

FIG. 7 is a block diagram showing an exemplary hardware configuration for sector remapping according to various embodiments of the present invention. As shown in FIG. 7, between enterprise storage applications 730 and SATA disk drives 700, a storage bridge 710 is employed for translating or mapping logical sectors, such as 520-byte sectors 704, into physical sectors, such as 512-byte sectors 702. In one implementation, the bridge 710 can be coupled to a SATA disk drive as a separate component in the system. Alternatively, the bridge 710 is integrated into the disk drive 700. The bridge 710 is also configured to communicate with host servers (not shown) where the enterprise storage applications 730 reside over a network 720 that supports different transport protocols such as FC protocols.

Typically, the storage bridge 710 is a chip or circuit board, such as an ASIC (Application Specific Integrated Circuit), with a built-in processor (e.g., processor 716 in FIG. 7) to execute pre-programmed software code stored in the memory space (e.g., memory 718 in FIG. 7) of the bridge. The software code pre-programmed in the bridge 710 includes programs or computer-readable instructions for performing sector remapping algorithms. Specifically, as shown in FIG. 7, the bridge 710 comprises a functional module for sector remapping 712 and a functional module for data transmission 714. The sector remapping module 712, also referred as a sector translator, is configured to perform sector remapping algorithms, such as the various algorithms described above in connection with FIGS. 3a-b, 4a-c. For example, if the sector mapping module 712 is configured to perform the sector mapping algorithm illustrated in FIG. 5, the 520-byte sectors 704 received at the bridge 710 will be written into the disk drives 700, along with necessary padded data, via a number of frames 706. The data transmission module or data transmitter 714 is configured to transfer data through the frames into the disk drive. Although the sector translator 712 and data transmitter 714 are shown as separate units in FIG. 7, it should be understood that they can be one integrated unit. Both functional modules can be implemented as pre-programmed computer-readable instructions stored in the memory 718 and executable by the processor 716 in the bridge 710 in FIG. 7. By use of the bridge 710, logical sectors can be mapped into physical sectors to facilitate writing data into disk drives 700.

In FIG. 7, the disk drives 700 are illustrated as SATA disks, although it should be understood that the applicability of the present invention is not so limited. The present invention may be implemented with any other storage devices in need of sector remapping mechanisms. Usually the storage disks follow standard configurations and can be customized by different vendors to provide additional features or accommodate their customers' needs. For example, to work with the above-described bridge 710 and accomplish the sector remapping algorithm in FIG. 5, the disk drives 700 need to be modified to support the write operations 512-516 as described above. In implementation, the disk drive 700 is configured to include additional software programs for determining whether a received frame is a real data frame or a padded data frame, and further, either disabling the writing of padded data or replacing the padded data with unmodified data in the disk sectors.

In practice, the methods, processes or steps described herein may constitute one or more programs made up of machine-executable or computer-executable instructions. The above description, particularly with reference to the steps and flow charts in FIGS. 3a, 3b, 4a and 5, enables one skilled in the art to develop such programs, including such instructions to carry out the operations represented by logical blocks on suitably-configured processors. The machine-executable instructions may be written in a computer programming language or may be embodied in firmware logic or in hardware circuitry. If written in a programming language conforming to a recognized standard, such instructions can be executed on a variety of hardware platforms for interfacing with a variety of operating systems. The present invention is not described with reference to any particular programming language, but it will be appreciated that a variety of programming languages may be used to implement the teachings of the invention as described herein. Furthermore, it is common in the art to speak of software, in one form or another (e.g., program, procedure, process, application, module, logic), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein. In addition, one of ordinary skill in the art will recognize that the terms "computer-readable storage medium" or "machine readable medium" include memory space and any type of storage device accessible by a processor Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of storing data blocks into a storage device having a plurality of physical sectors, comprising:
    forming a first frame containing a first data padding associated with a first physical sector in said storage device;
    forming a second frame containing said data blocks to be written into said storage device, said data blocks comprising one or more logical sectors, said logical sectors different from said physical sectors at least in size;
    forming a third frame containing a second data padding associated with a second physical sector in said storage device; and
    transmitting said first, second and third frames to said storage device in a single write operation,
    wherein a total of said first data padding, said data blocks and said second data padding comprise multiple physical sectors.

2. The method of claim 1, wherein said first frame comprises a reserved bit indicating said frame is a control frame.

3. The method of claim 1, further comprising:
    determining whether said first frame is a control frame based on a reserved bit in said first frame; and
    in response to the determination that said first frame is a control frame, disabling writing said first data padding into said storage device in said single write operation.

4. The method of claim 1, further comprising:
    determining whether said first frame is a control frame based on a reserved bit in said first frame; and
    in response to the determination that said first frame is a control frame, reading said first physical sector of said storage device; and
    replacing said first data padding with a data portion of said first physical sector to update said first frame before said single write operation.

5. The method of claim 1, wherein said first frame further comprises a header containing information that indicates a source address and a destination address for said first frame.

6. The method of claim 1, wherein said second frame comprises a reserved bit indicating said frame is a data frame.

7. The method of claim 1, further comprising:
    determining whether said second frame is a data frame based on a reserved bit in said first frame; and
    in response to the determination that said second frame is a data frame, writing said data blocks into said storage device in said single write operation.

8. The method of claim 1, wherein said second frame further comprises a header containing information that indicates a source address and a destination address for said second frame.

9. The method of claim 1, wherein said third frame comprises a reserved bit indicating said third frame is a control frame.

10. The method of claim 1, further comprising:
    determining whether said third frame is a control frame based on a reserved bit in said third frame; and
    in response to the determination that said third frame is a control frame, disabling writing said second data padding into said storage device in said single write operation.

11. The method of claim 1, further comprising:
determining whether said third frame is a control frame based on a reserved bit in said first frame; and
in response to the determination that said third frame is a control frame, reading said second physical sector of said storage device; and
replacing said second data padding with a data portion of said second physical sector to update said first frame before said single write operation.

12. The method of claim 1, wherein said third frame further comprises a header containing information that indicates a source address and a destination address for said third frame.

13. An apparatus comprising:
a sector translator configured to
receive a logical data sector, and
calculate data to be padded to said logical data sector to form multiple physical data sectors; and
a transmitter coupled to said sector translator, said transmitter configured to
generate frames for writing said logical data sector into a storage device comprising a plurality of physical sectors for storing data, said frames comprising a control frame containing at least a portion of said padded data, and
transfer said logical data sector into said storage device via said frames so that said multiple physical data sectors excluding said padded data are written into said plurality of physical sectors in a single write operation.

14. The apparatus of claim 13, wherein said multiple physical data sectors comprise a lower boundary sector and an upper boundary sector.

15. The apparatus of claim 14, wherein said sector translator is further configured to calculate a first portion of said padded data corresponding to a portion of said lower boundary sector.

16. The apparatus of claim 15, wherein said sector translator is further configured to calculate a second portion of said padded data corresponding to a portion of said upper boundary sector.

17. The apparatus of claim 13, wherein said frames comprise one or more data frames containing said logical data sector.

18. The apparatus of claim 17, wherein each of said frames contains a reserved bit indicating whether the frame is a control frame or a data frame.

19. A storage bridge comprising said apparatus of claim 13.

20. An Application Specific Integrated Chip (ASIC) comprising said apparatus of claim 13.

21. The apparatus of claim 13, wherein said storage device is one of an array of storage devices.

22. A storage area network comprising said array of storage devices of claim 21.

23. The apparatus of claim 13, wherein said storage device is configured to integrate said apparatus therein.

24. The apparatus of claim 13, wherein said storage device comprises a drive in communication with said apparatus, said drive configured to receive said frames from said transmitter.

25. The apparatus of claim 24, wherein said drive is further configured to determine whether each of said received frames is a control frame containing at least a portion of said padded data, and if so, to disable writing said portion of said padded data into said storage device.

26. The apparatus of claim 24, wherein said drive is further configured to determine whether each of said received frames is a control frame containing at least a portion of said padded data, and if so, to replace said portion of said padded data with a corresponding data portion in one of said plurality of physical sectors prior to writing said multiple physical data sectors.

27. The apparatus of claim 13, wherein said sector translator is further configured to receive said logical data sector from a storage application outside said apparatus.

28. The apparatus of claim 27, wherein said storage application communicates with said apparatus via one or more network connections, said one or more network connections comprising at least one Fibre Channel (FC) links.

29. A storage device comprising:
a plurality of physical sectors for storing data; and
a drive configured to
receive a write command in connection with writing data into said storage device,
receive one or more frames containing said data, and
for each of said one or more frames, determine whether said frame is a control frame comprising at least a portion of padding data or a data frame comprising at least a portion of said data;
wherein a total of said data and said padding data in said one or more frames comprise multiple physical sectors to be written into said storage device in an unaligned write operation.

30. The storage device of claim 29, wherein said drive is further configured to:
for each of said one or more frames, if said frame is determined to be a data frame comprising at least a portion of said data, enable writing said portion of said data in said storage device in said unaligned write operation; and
if said frame is a control frame comprising a least a portion of padding data,
identify a data portion of a physical sector corresponding to said portion of padding data, and
disable writing said portion of padding data into said data portion of said physical sector during said unaligned write operation.

31. The storage device of claim 29, wherein said drive is further configured to:
for each of said one or more frames, if said frame is determined to be a data frame comprising at least a portion of said data, enable writing said portion of said data in said storage device in said unaligned write operation; and
if said frame is a control frame comprising at least a portion of padding data,
read a boundary physical sector associated with said portion of padding data in said storage device, and
replace said portion of padding data with a data portion in said boundary physical sector before said unaligned write operation.

32. The storage device of claim 29, wherein each of said one or more frames comprises a reserved bit indicating whether said frame is a control frame or a data frame.

33. The storage device of claim 29, wherein each of said one or more frames comprises a header containing information indicating a source and destination for said frame.

34. The storage device of claim 29, further comprising a bridge coupled to said drive, said bridge configured to:
receive said data from one or more storage applications in one or more logical sectors, said logical sector having a different storage size from said physical sector; and
map said one or more logical sectors into said multiple physical sectors to be written into said storage device in an unaligned write operation.

35. The storage device of claim 34, wherein said bridge is further configured to create said one or more frames in remapping said one or more logical sectors into said multiple physical sectors.

36. The storage device of claim 35, wherein said bridge is further configured to create a control frame by including at least a portion of said padding data into said control frame, said control frame containing information identifying a boundary physical sector associated with said padding data in said storage device.

37. The storage device of claim 35, wherein said bridge is further configured to create a data frame by including at least a portion of said data into said data frame.

38. The storage device of claim 35, wherein said bridge is further configured to transmit said one or more frames to said drive.

39. The storage device of claim 29, wherein said one or more frames comprise at least a first control frame including a first portion of said padding data that corresponds to a data portion of a first physical sector of said multiple physical sectors to be written in said storage device, and at least a data frame comprising said data or a portion thereof.

40. The storage device of claim 39, wherein said one or more frames further comprise at least a second control frame including a remaining portion of said padding data that corresponds to a data portion of a second physical sector of said multiple physical sectors to be written in said storage device.

41. The storage device of claim 40, wherein said first and second physical sectors define a physical sector range in said storage device for said data to be written.

42. The storage device of claim 40, wherein said first physical sector is a lower boundary sector of said sector range, and said second physical sector is an upper boundary sector of said sector range.

43. A computer readable storage medium comprising computer-executable instructions for storing data blocks into a storage device having a plurality of physical sectors, said instructions, when executed, causing a computer to:
generate a first frame containing a first data padding associated with a first physical sector in a storage device;
generate a second frame containing said data blocks to be written into said storage device, said data blocks comprising one or more logical sectors, said logical sectors different from said physical sectors at least in size;
generate a third frame containing a second data padding associated with a second physical sector in said storage device; and
transmit said first, second and third frames to said storage device in a single write operation,
wherein a total of said first data padding, said data blocks and said second data padding comprise multiple physical sectors.

44. A computer readable storage medium comprising computer-executable instructions, said instructions, when executed, causing a computer to:
receive a logical data sector;
calculate data to be padded to said logical data sector to form multiple physical data sectors;
generate frames for writing said logical data sector into a storage device comprising a plurality of physical sectors for storing data, said frames comprising a control frame containing at least a portion of said padded data; and
transfer said logical data sector into said storage device via said frames so that said multiple physical data sectors excluding said padded data are written into said plurality of physical sectors in a single write operation.

45. A computer readable storage medium comprising computer-executable instructions, said instructions, when executed, causing a computer to:
receive a write command in connection with writing data into a storage device;
receive one or more frames containing said data; and
for each of said one or more frames, determine whether said frame is a control frame comprising at least a portion of padding data or a data frame comprising at least a portion of said data;
wherein a total of said data and said padding data in said one or more frames comprise multiple physical sectors to be written into said storage device in an unaligned write operation.

* * * * *